United States Patent [19]

Nemeth

[11] Patent Number: 5,454,633
[45] Date of Patent: Oct. 3, 1995

[54] DISK STORAGE BOX

[75] Inventor: Bradley M. Nemeth, San Francisco, Calif.

[73] Assignee: Wendell Brooks, Inc., Fort Worth, Tex.

[21] Appl. No.: 209,165

[22] Filed: Mar. 10, 1994

[51] Int. Cl.[6] .............................. A47F 1/06; G11B 33/02
[52] U.S. Cl. ........................ 312/9.54; 206/425; 220/532; 220/533
[58] Field of Search ..................... 206/309, 311, 206/425, 444; 220/532, 533; 312/9.54, 183, 193, 244, 348.3, 348.5, 902

[56] References Cited

U.S. PATENT DOCUMENTS

| | | | |
|---|---|---|---|
| 4,366,904 | 1/1983 | Roskvist | 220/532 |
| 4,545,484 | 10/1985 | Rohner | 220/533 |
| 4,640,416 | 2/1987 | Northrup et al. | 206/425 |
| 4,641,897 | 2/1987 | Long et al. | 220/532 |
| 4,776,482 | 10/1988 | Wolters et al. | 220/533 |
| 4,848,574 | 7/1989 | Murphy et al. | 206/425 |
| 4,940,142 | 7/1990 | Behrens et al. | 206/311 |
| 5,027,950 | 7/1991 | Gutierrez et al. | 206/425 |
| 5,205,625 | 4/1993 | Koch | 312/9.54 |
| 5,219,216 | 6/1993 | Hassel et al. | 312/9.54 |
| 5,253,756 | 10/1993 | Goekler | 220/533 |
| 5,311,993 | 5/1994 | Koch | 220/532 |

*Primary Examiner*—José V. Chen
*Assistant Examiner*—Rodney B. White
*Attorney, Agent, or Firm*—Grady K. Bergen

[57] ABSTRACT

A storage tray for holding different sized data storage media, such as diskettes, has more than one mode. The storage tray has a flat bottom having an upper surface and opposite front and rear walls which extend upward from the bottom. A pair of opposite sidewalls extend between the front and rear walls and are provided with an inwardly protruding ledge to define a recessed portion in which diskettes of a first size are stored. At least one removable plate having a center partition inserts into the storage tray and is supported on the opposite ledges so that the lower surface of the tray faces the bottom. The plate allows diskettes of a second, smaller size to be stored on the upper surface of the plate on either side of the partition and between the sidewalls of the storage tray. Dividing members can be inserted into the plate slots for supporting the diskettes of the second size. The dividing members releasably couple together. The legs of the dividing members are inserted into corresponding opposite divider slots of the opposite ledges, when the dividing members are coupled together, for supporting the diskettes of the first size.

16 Claims, 4 Drawing Sheets

000# DISK STORAGE BOX

BACKGROUND OF THE INVENTION

1. Field of the Invention

This invention relates to a storage tray for storing computer disks or other data storage media.

2. Description of the Prior Art

Most personal computers, to date, are adapted with disk drives for use with either a magnetic 5¼ inch diskette, a magnetic 3½ inch micro diskette or both. Both the 5¼ inch and 3½ inch diskettes are provided with flat, square covers or casings to prevent damage to the magnetic data storage media held within. Computers may also be provided with CD-ROM drives for reading data from compact disks. The compact disks are also usually stored in flat, square cases. All of these disks may be used to store computer programs, documents or other data. Often a user will have several different programs, documents or compiled data stored on several different disks. The disks may be labeled to facilitate locating a desired program or document which is stored on a particular disk.

Because several different disks may be used, it is often beneficial to have a storage box or tray to hold the disks or diskettes so that they may be easily located. In many cases, the storage trays are sized or adapted for storing only a single size disk, requiring separate storage trays to be used when storing different size disks. Storage trays are marketed that are adaptable to store different size disks or diskettes so that they may be easily located without requiring a separate storage tray or container. However, improvements are desired.

SUMMARY OF THE INVENTION

A storage tray for holding generally flat, data storage media is provided having a flat bottom with an upper surface. Opposite front and rear walls extend upward from the bottom, and a pair of opposite sidewalls extend between the front and rear walls. A ledge protrudes laterally inward and extends along the entire length of each of the sidewalls from the front wall to the rear wall. Each ledge is opposite from the other and is disposed above and parallel to the bottom to define a recessed portion between the ledges to selectively store data storage media of a first size within the recessed portion. Each ledge has a plurality of longitudinally spaced apart divider slots which correspond and align with the divider slots of the opposite ledge.

At least one removable, substantially flat plate having an upper surface and a lower surface is adapted to extend across the recessed portion and be supported by the opposite ledges so that the lower surface faces the bottom. The plate has an upstanding partition member which protrudes upward from the upper surface of the plate and extends longitudinally along the center of the upper surface of the plate to selectively store data storage media of a second size on each side of the partition. The plate has a plurality of plate slots which are longitudinally spaced apart on each side of the partition and extend through the thickness of the plate.

A pair of substantially flat dividing members are also provided. Each dividing member has a leg which is adapted to insert into one of the plate slots, in a first mode, so that the dividing members can be held generally upright and perpendicular to the sidewalls on each side of the partition. Each dividing member also has coupling means for releasably coupling the dividing members together, in a second mode, to form a divider with the legs of the dividing members adapted to insert into corresponding opposite divider slots of the opposite ledges. The divider is held generally upright and perpendicular to the sidewalls and extends across the recessed portion when inserted into the divider slots.

DETAILED DESCRIPTION OF THE INVENTION

Figure 1:
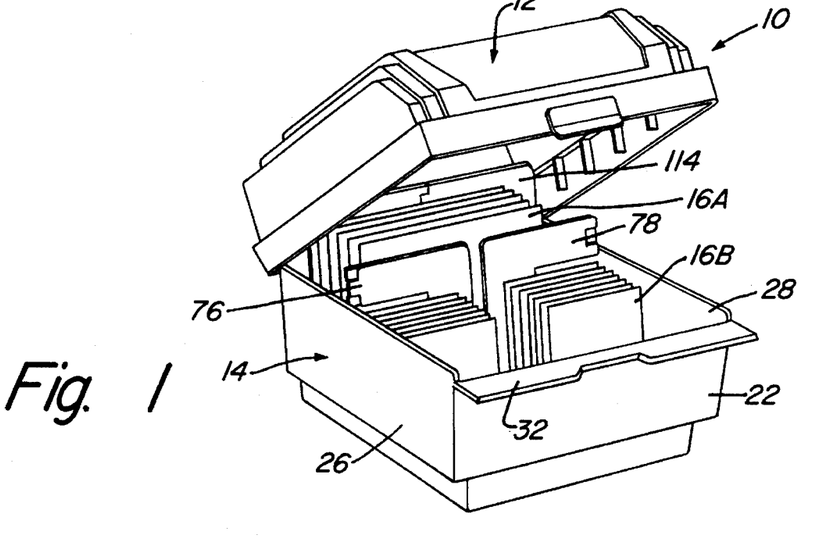
FIG. 1 is a perspective view of a storage box with a storage tray constructed in accordance with the invention.

Referring more specifically to the figures, FIG. 1 shows a storage box 10 for holding substantially flat data storage media, such as computer disks for personal computers. The storage box 10 is made from a molded plastic material and has a lid 12 which is pivotally mounted to a storage tray 14. FIG. 1 shows a plurality of magnetic 5¼ inch computer diskettes 16A, stored in the rear of the tray 14. Stored in the front of the tray 14 are a plurality of the smaller 3½ inch computer diskettes 16B.

Figure 2:
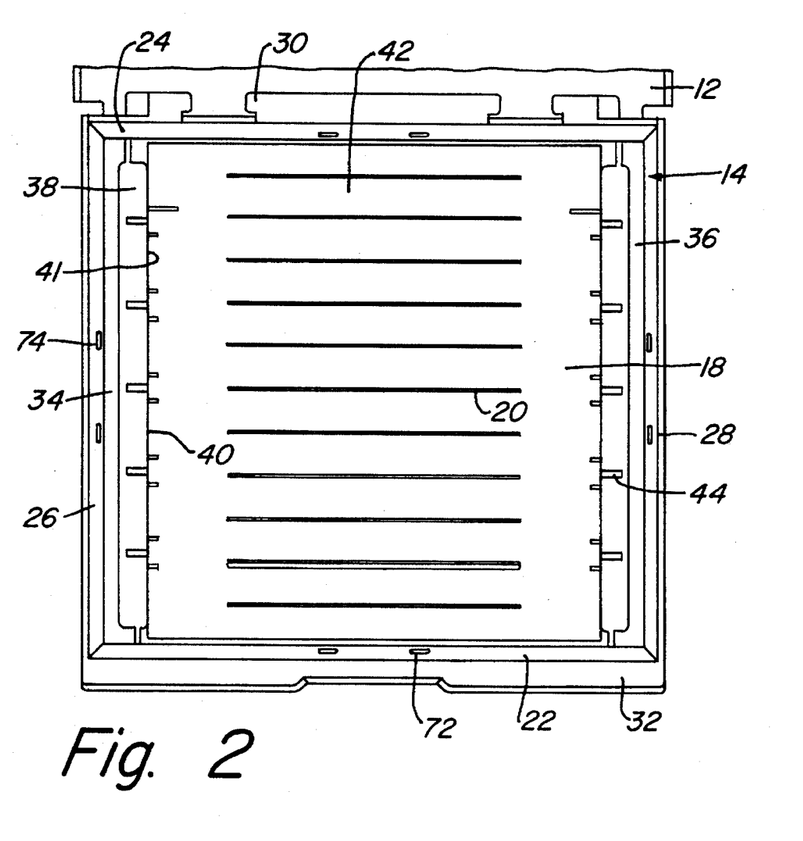
FIG. 2 is a top plan view of the storage tray of FIG. 1.

As can be more clearly seen in FIG. 2, the storage tray 14 of the storage box 10 comprises a bottom 18 having an upper surface which is substantially flat. The bottom 18 is provided with a plurality of transverse ridges 20 which are longitudinally spaced apart on the upper surface. Opposite front and rear walls 22, 24 extend upward from the bottom 18 and are substantially parallel to each other. A pair of flat, opposite sidewalls 26, 28 extend between the front and rear walls 22, 24. The sidewalls 26, 28 are substantially parallel to each other and perpendicular to the front and rear walls 22, 24. The lid 12 of the storage box 10 is mounted to the rear wall 24 of the storage tray 14 by means of a hinge 30 which allows the lid 12 to pivot relative to the storage tray 14. The lid 12 is constructed to fit around the upper edges of the tray 14, when closed, and engage a lip 32 protruding outward from the upper edge of the front wall 22.

A pair of opposite ledges 34, 36 are provided with the tray 14, with the ledge 34 protruding laterally inward from the sidewall 26, and the ledge 36 protruding laterally inward from the sidewall 28. The ledges 34, 36 extend for the entire length of the sidewalls 26, 28 from the front wall 22 to the rear wall 24. Each ledge 34, 36 is disposed above and parallel to the upper surface of the bottom 18. The upper surface of the ledges 34, 36 has a raised portion 38. Each of the ledges 34, 36 terminates inwardly at an inner edge 40 and extends downward from the inner edge 40 to the bottom 18 to define an inner face 41, which can be more clearly seen in FIG. 6. A recessed portion 42 is defined between the inner face 41 of each of the ledges 34, 36. The inner face 41 of the ledges 34, 36 are spaced apart from each other a distance so that the larger, 5¼ inch diskette 16A can be inserted into the recessed portion 42 and rest on the bottom 18 with the diskette 16A extending transversely across the recessed portion 42.

Each of the ledges 34, 36 has a plurality of longitudinally spaced apart divider slots 44. The divider slots 44 are formed in the raised portion 38 of the ledges 34, 36 and extending outward from the inner edge 40 perpendicular to the sidewalls 26, 28. The divider slots 44 of each ledge 34, 36 are aligned and correspond with the divider slots 44 of the other ledge 34, 36.

Figures 3, 4:
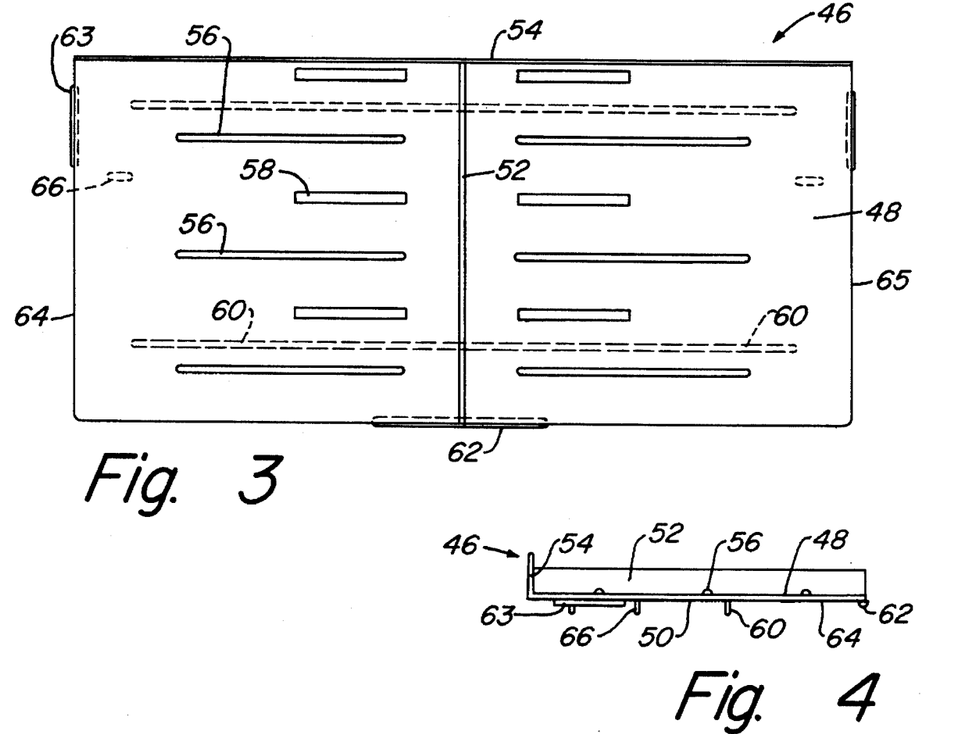
FIG. 3 is a top plan view of a plate for use with the storage tray of FIG. 1 and constructed in accordance with the invention.
FIG. 4 is a side elevational view of the plate of FIG. 3.
Figure 5:
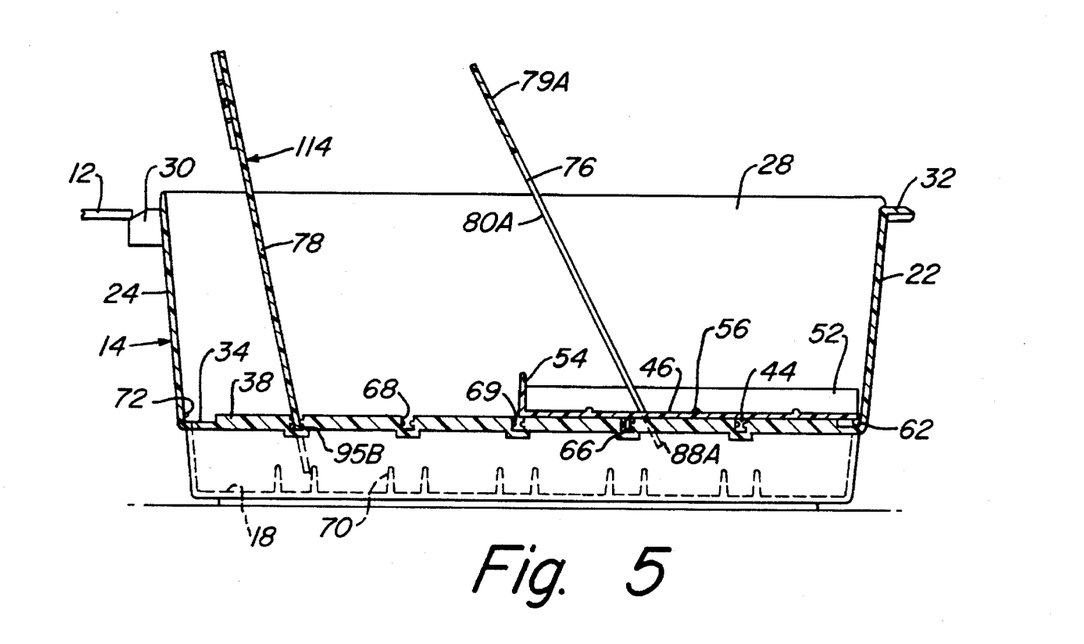
FIG. 5 is a side cross-sectional view of the storage tray of FIG. 2, showing the plate of FIG. 3 inserted into the storage tray.
Figure 6:
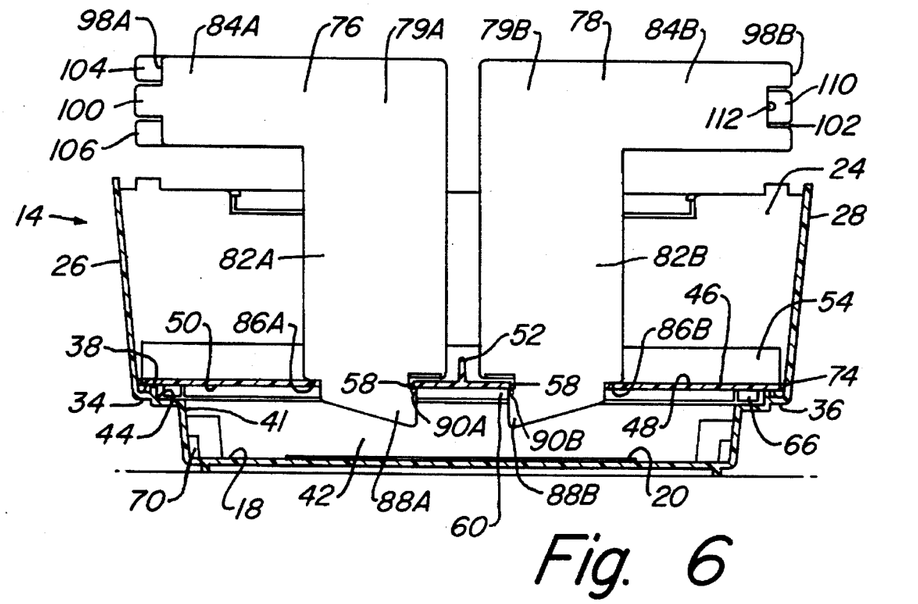
FIG. 6 is a front cross-sectional view of the storage tray of FIG. 2 shown with a pair of dividing members inserted into the plate of FIG. 3.

Referring to FIG. 3, a least one rectangular plank or plate 46 having an upper surface 48 and a lower surface 50 (FIG. 4) is provided with the storage tray 14. An upstanding center partition member 52 extends longitudinally along the center of the upper surface 48 of the plate 46. The plate 46 is configured to extend across the recessed portion 42 and be supported by the opposite ledges 34, 36 as shown in FIGS. 5 and 6, with the center partition 52 being generally parallel to the sidewalls 26, 28. When inserted into the storage tray 14, the plate 46 rests on the ledges 34, 36. When so inserted, the center partition member 52 is spaced apart from either of the sidewalls 26, 28 a distance which is less than the distance between the inner face 41 of the ledges 34, 36. This allows the smaller, 3½ inch disks 16B to be inserted transversely on either side of the partition 52 between the partition 52 and either of the sidewalls 26, 28. As shown in FIG. 4, a lateral member or rib 54 extends along one edge of the plate 46 transverse to the center partition 52. The rib 54 provides structural support to the plate 46 and also serves as a partition to prevent the smaller diskettes 16B from sliding from the edge of the plate 46. A plurality of transverse ridges 56 are also longitudinally spaced apart along the upper surface 48 of the plate 46 to prevent sliding of the diskettes 16B along the upper surface 48 of the plate 46.

A plurality of plate slots 58 are formed in the plate 46 which extend through the thickness of the plate 46. The plate slots 58 are longitudinally spaced apart and are located adjacent to and on either side of the center partition member 52.

Formed on the lower surface 50 of the plate 46 are a pair of parallel ribs 60. The ribs 60 extend transversely across the lower surface 50 of the plate 46 and each has a length which is less than the distance between the inner edges 40 of the opposite ledges 34, 36. The ribs 60 provide structural strength to the plate 46. A locking member 62 protrudes from the lower surface 50 from the edge of the plate 46 opposite the lateral rib 54. Side locking members 63 also extend from the lower surface 50 and outward from side edges 64, 65 the plate 46, as shown in FIG. 3. Located adjacent to each side edge 64, 65 on the lower surface 50 the plate are lugs 66 which insert into the divider slots 44 of the ledges 34, 36. As shown in FIG. 5, each of the divider slots 44 has opposing walls 68 on which small protuberances 69 are formed.

A pair of generally parallel divider retaining members 70 extend upward from the bottom 18 of the storage tray 14 and inward from the inner face 41 of each of the ledges 34, 36 which correspond to an adjacent divider slot 44. The retaining members 70 are spaced apart from each other a distance slightly greater than the distance between the opposing walls 68 of each adjacent divider slot 44.

A pair of small lugs 72 (FIG. 2) is located on the inner surface of each of the front and rear walls 22, 24 approximately level with the raised portion 38 of the ledges 34, 36. The lugs 72 protrude from the inner surface of the front and rear walls 22, 24 approximately one-half millimeter. Located on either sidewall 26, 28, are side lugs 74, as shown in FIG. 6, which are also approximately level with the raised portion 38 of the ledges 34, 36. The side lugs 74 also protrude from the inner surface of the sidewalls 26, 28 approximately one-half millimeter.

Figures 7, 8:
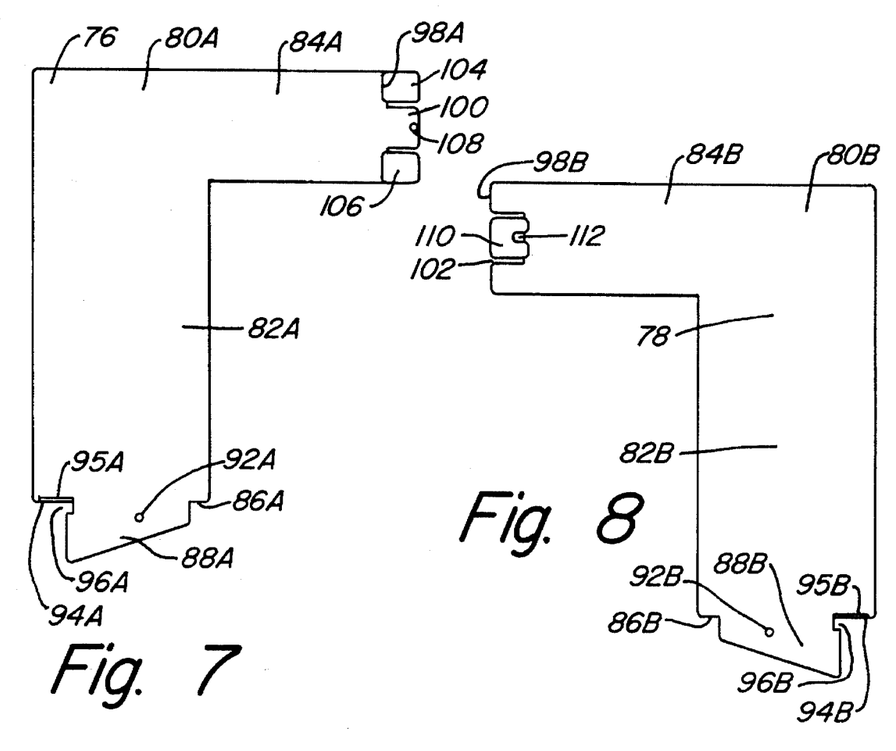
FIG. 7 is a side elevational view of one of the dividing members constructed in accordance with the invention.
FIG. 8 is a side elevational view of another of the dividing members constructed in accordance with the invention.

Provided with the storage tray 14 is at least one pair of flat, L-shaped dividing members 76, 78, as shown in FIGS. 6–8. The dividing members 76, 78 are constructed similarly with similar components being designated with the same numeral and an "A" or "B" to designate the dividing members 76, 78, respectively. Each of the dividing members has a forward surface 79A, 79B, shown in FIG. 6, and a rearward surface 80A, 80B, shown in FIGS. 7 and 8. Each of the dividing members 76, 78 has a leg portion 82A, 82B which extends perpendicularly from a lateral arm 84A, 84B. The leg portion 82A, 82B terminates in a straight lower edge 86A, 86B. A flat tab 88A, 88B extends downward from the lower edge 86A, 86B of each of the dividing members 76, 78. A small protuberance 90A, 90B (FIG. 6) approximately one millimeter in height is formed on the forward surface 79A, 79B of each tab 88A, 88B. Likewise, a similar protuberance 92A, 92B (FIGS. 7 and 8) is formed on the rearward surface 80A, 80B of each tab 88A, 88B.

The width of each tab 88A, 88B is less than the width of the lower edge 86A, 86B on each of the dividing members 76, 78 so that an outer shoulder 94A, 94B is defined on the lower edge 86A, 86B opposite the lateral arm 84A, 84B. Extending from the forward and rearward surfaces 79A, 79B, 80A, 80B along the outer shoulder 94A, 94B are small shoulder lugs 95A, 95B which protrude approximately one-half millimeter. A notch 96A, 96B is formed in the edge of the tab 88A, 88B adjacent to the outer shoulder 94A, 94B where the tab 88A, 88B is joined to the lower edge 86A, 86B.

Figures 9, 10:
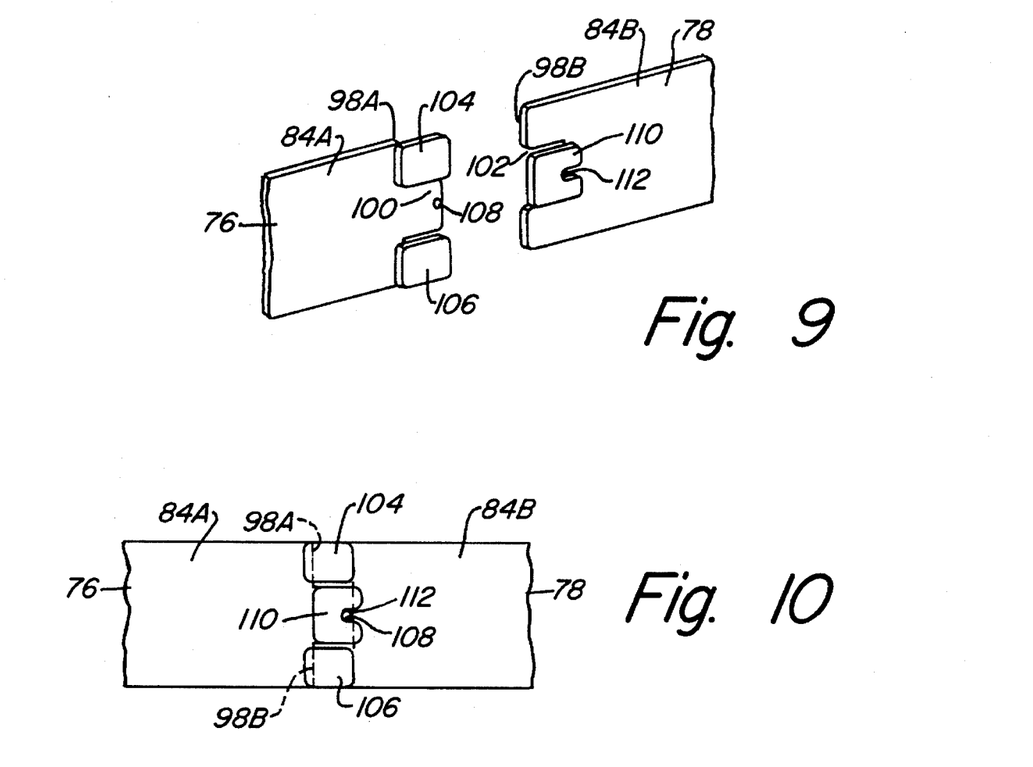
FIG. 9 is a perspective view showing coupling means on the ends of the dividing members of FIGS. 7 and 8.
FIG. 10 is a side elevational view of the dividing members of FIGS. 7 and 8 shown coupled together.

Located on the free end 98A, 98B of the lateral arms 84A, 84B of the dividing member 76, 78 are coupling means for releasably coupling the arms 84A, 84B of the dividing members 76, 78 together. As shown in FIGS. 9–10, the coupling means comprises a center tab 100 formed on the free end 98A of the arm 84A of dividing member 78. A slot 102 is formed in the free end 98B of the arm 84B and is configured to receive the center tab 100 of the arm 84A. Protruding from the rearward surface 80A on the free end 98A on either side of the center tab 100 of the arm 84A are locking tabs 104, 106 of the dividing member 76. Located on the center tab 100 is a small, rounded protuberance 108 which protrudes from the rearward surface of the center tab 100.

Figure 11:
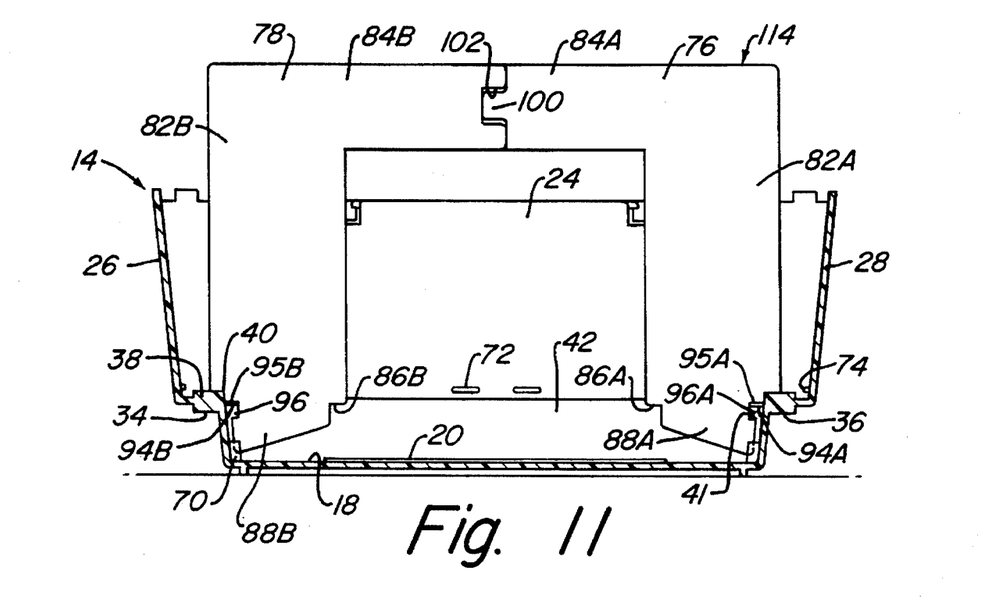
FIG. 11 is a cross-sectional view of the storage tray of FIG. 2 shown with the dividing members coupled together and inserted into the storage tray.

A locking tab 110 also protrudes from the rearward surface 80B of the dividing member 78 on the free end 98B of the arm 84B and extends over the slot 102. The locking tab 110 has an aperture 112 for receiving the protuberance 108 on the center tab 100 when the arms 84A, 84B are coupled together. The dividing members 76, 78 couple together to form a U-shaped divider 114, which is shown in FIG. 11.

In use, different size disks can be stored in the storage box 10 in the following manner. To store smaller disks, for example the 3½ inch diskettes 16B, at least one plate 46 is positioned within the tray 14 between the sidewalls 26 and 28 with the lower surface 50 of the plate 46 facing the upper surface of the bottom 18. As shown in FIG. 5, with the plate 46 positioned against the front wall 22, the plate 46 will extend rearward so that substantially half of the recessed portion 42 is covered by the plate 46. When the plate 46 is inserted into the storage tray 14, the lower surface 50 of the plate 46 will contact the raised portion 38 of the ledges 34, 36, and the lugs 66 will be received within the divider slots 44 of the ledges 34, 36. The lugs 66 prevent the plate 46 from sliding longitudinally along the upper surface of the ledges 34, 36. With the plate 46 seated on the ledges 34, 36, as shown in FIG. 5, the locking member 62 on the edge of the plate 46 locks under the lugs 72 of the front wall 22. Each of the side locking members 63 (FIG. 6) on the side edges 64, 65 of the plate 46 also lock under one of the side lugs 74 on each sidewall 26, 28. This helps retain the plate 46 against the ledges 34, 36. The lateral rib 54 will extend across the approximate center line of the recessed portion dividing the storage tray 14 approximately in half between the front and rear walls 22, 24.

If only the smaller disks 16B are to be stored in the storage tray 14, a second plate (not shown) identical to plate 46 may be positioned within the storage tray 14 so that it covers the rear half of the recessed portion 42, converting the storage tray 14 for use only with the smaller disks 16B. If a second plate is used, the second plate is inserted into the tray 14 substantially in the same manner as described above. The locking member 62 on the second plate, however, locks under the lugs 72 of the rear wall 24 with the second plate extending forward from the rear wall 24. With two plates inserted into the storage tray 14 as described, the entire recessed portion 42 is covered.

Once the plate 46 is positioned within the storage tray 14, the dividing members 76, 78 may be inserted into the plate slots 58 of the plate 46, as shown in FIGS. 5 and 6. With the lateral arms 84A, 84B of each of the dividing members 76, 78 extending outward toward the sidewalls 26, 28. The width of the plate slots 58 is less than the width of the lower edge 86A, 86B of the leg 82A, 82B of each dividing member 76, 78 so that only the tab 88A, 88B inserts into the plate slot 58. As shown in FIG. 6, the width of the tab 88A, 88B is slightly greater than the width of the plate slot 58 so that each dividing member 76, 78 must be angled slightly during insertion so that the notch 96A, 96B engages the corner of the slot 58 first. The tab 88A, 88B can then be fully inserted into the slot 58. The slightly greater width of the tab 88A, 88B helps retain the dividing members 76, 78 within the plate slots 58, so that once the dividing members 76, 78 are inserted fully into the plate slots 58, they may only be removed by angling them in a reverse manner. The protuberances 90A, 90B, 92A, 92B also help retain the dividing members 76, 78 in the plate slots 58. With the dividing members 76, 78 inserted into the plate slots 58, the dividing members 76, 78 are held in a generally upright manner. The smaller diskettes 16B may be positioned on the plate 46 on either side of the center partition 52 with the dividing members 76, 78 supporting the diskettes 16B in a generally upright manner, as shown in FIG. 1. The ridges 56 prevent the lower edge of the diskettes 16B from sliding along the upper surface 48 of the plate 46.

If the storage tray 14 is to be used to store only the larger 5¼ inch diskettes 16A, the plate or plates 46 should be removed from the tray 14 so that the recessed portion 42 is completely uncovered. The U-shaped divider 114 is assembled by coupling the dividing members 76, 78 together in the following manner. With the free ends 98A, 98B of the lateral arms 86A, 86B facing each other, as shown in FIG. 9, the dividing members 76, 78 are aligned so that they are coplaner with each other. The free ends 98A, 98B are then brought together, with the center tab 100 of dividing member 76 inserting into the slot 102 of dividing member 78 and the locking tab 110 of the arm 84B inserting between the locking tabs 104, 106 of the arm 84A. By bringing the arms 84A, 84B together, the locking pads 104, 106 will overlap the free end 98B of the arm 84B and the locking pad 110 will overlap the center tab 100 on the arm 84A. The rounded protuberance 108 is received within the aperture 112 so that the arms 84A, 84B are rigidly locked together so that the U-shaped divider 114 is formed, as shown in FIG. 11. The dividing members 76, 78 are decoupled merely by forcing the protuberance 108 from the aperture 118 by slightly twisting the arms 84A, 84B and separating them.

After coupling the dividing members 76, 78 together to form the U-shaped divider 114, the legs 82A, 82B are inserted into corresponding opposite divider slots 44, as shown in FIGS. 5 and 11, with the outer shoulder 94A, 94B of each dividing member 76, 78 resting against the bottom of the corresponding opposite divider slots 44. The shoulder lugs 95A, 95B and the opposing protuberances 69 help retain the divider 114 within the divider slots 44. The tab 88A, 88B of each dividing member 76, 78 is also inserted between the pair of retaining members 70 adjacent to the corresponding opposite divider slots 44 in which the legs 82A, 82B of the divider 114 are inserted. The retaining members 70 prevent the divider 114 from pivoting within the slots 44 so that the divider 114 is held in a generally upright fashion, as shown in FIG. 5.

With the divider 114 positioned within the divider slots 44, the divider 114 extends transversely across the recessed portion 42. The larger diskettes 16A are inserted into the recessed portion 42 of the tray 14 with the lower edge of the diskettes 16A resting on the upper surface of the bottom 18, the diskettes 16A being supported by the divider 114 in a generally upright manner. The transverse ridges 20 prevent the lower edge of the diskette 16A from sliding longitudinally along the bottom 18.

It should be noted that the storage tray 14 can accommodate either the large disks 16A or the smaller disks 16B by themselves or in combination. In order to accommodate both the larger disks 16A and the smaller disks 16B, simultaneously, one plate 46 is positioned within the tray 14 so that only half of the recessed portion 42 is covered. The larger diskettes 16A are then positioned in the uncovered recessed portion 42 and supported by the divider 114. The smaller diskettes 16B are positioned on the plate 42 and supported by the dividing members 76, 78 as described above.

This invention allows different size disks or other flat, data storage media to be stored within a storage tray or box in a generally upright manner so that the disks are easily located. By having the plate raised on ledges, smaller diskettes may be stored at approximately the same height as the larger diskettes. By removing the plates, the storage tray can be utilized to store only the larger diskettes. Likewise, by positioning the plates across the entire recessed portion of the tray, the storage tray can be converted solely for use with smaller diskettes. The dividing members can be used when storing either the smaller or larger diskettes merely by using them individually or coupling them together.

While the invention has been shown in only one of its forms, it should be apparent to those skilled in the art that it is not so limited, but is susceptible to various changes without departing from the scope of the invention.

I claim:

1. A storage tray for holding generally flat, data storage media, the storage tray comprising in combination:

a bottom;

opposite front and rear walls extending upward from the bottom;

a pair of opposite sidewalls, each sidewall having a length and extending between the front and rear walls;

a pair of opposite ledges, each ledge protruding laterally inward from one of the opposite sidewalls, each ledge being disposed above the bottom to define a recessed portion between the ledges to selectively store media of a first size, each ledge having a plurality of longitudinally spaced apart slots, the slots of each ledge corresponding to and being aligned with the slots of the opposite ledge;

a least one removable, substantially flat plate having an upper surface and a lower surface, the plate adapted to extend across the recessed portion and be supported by the ledges so that the lower surface faces the bottom, the plate having an upstanding partition member which protrudes upward from the upper surface and extends longitudinally along the center of the upper surface to selectively store media of a second size on each side of the partition; and a pair of dividing members each dividing member having a laterally extending arm having coupling means for releasably coupling the dividing members together to form a divider, each of the dividing members having a leg adapted to insert into one of the corresponding opposite slots of the opposite ledges so that the divider is held generally upright and perpendicular to the sidewalls and extends across the recessed portion.

2. The tray of claim 1, wherein:

the plate has at least one downward protruding lug which is adapted to be received within one of the slots of the ledges to prevent longitudinal movement of the plate when the plate is supported by the ledges.

3. The tray of claim 1, wherein:

each ledge extends along the entire length of said one of the opposite sidewalls from the front wall to the rear wall.

4. The tray of claim 1, wherein:

there are two of the plates, each plate being of substantially the same size, one of the plates adapted to extend from the rear wall forward, and the other from the front wall rearward to selectively cover substantially one-half of the recessed portion when only one of the plates is employed and all of the recessed portion when both of the plates are employed.

5. A storage tray for holding generally flat, data storage media, the storage tray comprising in combination:

a bottom;

opposite front and rear walls extending upward from the bottom;

a pair of opposite sidewalls, each sidewall having a length and extending between the front and rear walls;

a pair of opposite ledges, each ledge protruding laterally inward from one of the opposite sidewalls, each ledge being disposed above the bottom to define a recessed portion between the ledges to selectively store media of a first size; and a least one removable, substantially flat plate having an upper surface and a lower surface, the plate adapted to extend across the recessed portion and be supported by the ledges so that the lower surface faces the bottom the plate having an upstanding partition member which protrudes upward from the upper surface and extends longitudinally along the center of the upper surface to selectively store media of a second size on each side of the partition; and wherein the ledges are provided with a plurality of divider slots which are longitudinally spaced apart;

the plate has at least one plate slot on either side of the partition which extends through the thickness of the plate; and wherein the tray further comprises:

a pair of dividing members, each of the dividing member having a leg adapted to insert into one of the plate slots of the plate in a first mode so that one of the dividing members is held generally upright and perpendicular to the sidewalls on each side of the partition; and wherein each dividing member has a laterally extending arm having coupling means for releasably coupling the dividing members together to form a divider, the legs of the dividing members adapted to insert into corresponding opposite divider slots of the opposite ledges in a second mode so that the divider is held generally upright and perpendicular to the sidewalls and extends across the recessed portion when in the second mode.

6. A storage tray for holding generally flat, data storage media, the storage tray comprising in combination:

a flat bottom having an upper surface;

opposite front and rear walls extending upward from the bottom;

a pair of opposite sidewalls, each sidewall having a length and extending between the front and rear walls;

a pair of opposite ledges, each ledge protruding laterally inward from and extending along the entire length of one of the opposite sidewalls from the front wall to the rear wall, each ledge being disposed above and parallel to the bottom to define a recessed portion between the ledges to selectively store media of a first size, each ledge having a plurality of longitudinally spaced apart divider slots which correspond and are aligned with the divider slots of the opposite ledge;

at least one removable, substantially flat plate having an upper surface and a lower surface, the plate adapted to extend across the recessed portion and be supported by the opposite ledges so that the lower surface faces the bottom, the plate having an upstanding partition member which protrudes upward from the upper surface of the plate and extends longitudinally along the center of the upper surface of the plate to selectively store media of a second size on each side of the partition, the plate having a plurality of plate slots which are longitudinally spaced apart on each side of the partition, each plate slot extending through the thickness of the plate; and a pair of substantially flat dividing members, each dividing member having a leg adapted to insert into one of the plate slots in a first mode so that one of the dividing members is held generally upright and perpendicular to the sidewalls on each side of the partition; and wherein each dividing member has coupling means for releasably coupling the dividing members together to form a divider in a second mode with the legs of the dividing members adapted to insert into corresponding opposite divider slots of the opposite ledges so that the divider is held generally upright and perpendicular to the sidewalls and extends across the recessed portion.

7. The storage tray of claim 6, wherein:

the plate has at least one downward protruding lug which is adapted to be received within one of the divider slots to prevent longitudinal movement of the plate when the plate is supported by the ledges.

8. The storage tray of claim 6, wherein:

there are two of the plates, each plate being of substantially the same size, one of the plates adapted to extend from the rear wall forward, and the other from the front wall rearward to selectively cover substantially one-half of the recessed portion when only one of the plates is employed and all of the recessed portion when both of the plates are employed.

9. The storage tray of claim 6, wherein:

each of the dividing members has a laterally extending arm having a free end which extends from the leg, the coupling means being located on the free end of the arm.

10. The storage tray of claim 6, wherein:

the leg of each dividing member has a lower end which terminates in a lower edge, and wherein a tab extends from the lower edge of each leg to define a shoulder, the shoulders of the dividing members inserting into the corresponding opposite divider slots when in the second mode; and wherein the tray further comprises:

a pair of divider retaining members which extend upward from the bottom adjacent to each divider slot, the tab of each leg inserting between the pair of retaining members when the shoulders are inserted into the corresponding opposite divider slots.

11. The storage tray of claim 6, wherein:

each of the ledges terminates inwardly in an inner edge and has an inner face which extends downward from the inner edge to the bottom.

12. A storage tray for holding different size generally flat diskettes, the storage tray comprising in combination:

a flat bottom having an upper surface;

opposite front and rear walls extending upward from the bottom;

a pair of opposite sidewalls, each sidewall having a length and extending between the front and rear walls;

a pair of opposite ledges, each ledge protruding laterally inward from one of the opposite sidewalls and extending along the entire length of said one of the opposite sidewalls from the front wall to the rear wall, each ledge being disposed above and parallel to the upper surface of the bottom, each ledge terminating inwardly in an inner edge and having an inner face which extends downward from the inner edge to the bottom to define a recessed portion between the ledges, the inner face of each ledge being spaced apart from the other so that a first diskette having a width is adapted to insert into the recessed portion and rest on the bottom, and wherein each ledge has a plurality of longitudinally spaced apart divider slots which correspond and are aligned with the divider slots of the opposite ledge;

at least one removable, substantially flat plate having an upper surface and a lower surface, the plate adapted to extend across the recessed portion and be supported by the opposite ledges so that the lower surface faces the bottom, the plate having an upstanding partition member which protrudes upward from the upper surface of the plate and extends longitudinally along the center of the upper surface of the plate, the partition being spaced apart from each of the sidewalls so that a second diskette, having a width which is less than the width of the first diskette, is adapted to insert between the partition and each of the sidewalls and rest on the upper of the plate, the plate having a plurality of plate slots which are longitudinally spaced apart, each slot extending through the thickness of the plate; and a pair of substantially flat, L-shaped dividing members, each dividing member having a leg adapted to insert into one of the plate slots in a first mode so that one of the dividing members is held generally upright on each side of the partition for supporting the second diskette so that the second diskette is held generally upright; and wherein each dividing member has a laterally extending arm having coupling means for releasably coupling the dividing members together to form a U-shaped divider with the legs of the dividing members adapted to insert into corresponding opposite divider slots of the opposite ledges in a second mode so that the divider is held generally upright and extends across the recessed portion when in the second mode for supporting the first diskette so that the first diskette is held generally upright.

13. The storage tray of claim 12, wherein:

the plate has at least one downward protruding lug which is adapted to be received within one of the divider slots to prevent longitudinal movement of the plate when the plate is supported by the ledges.

14. The storage tray of claim 12, wherein:

there are two of the plates, each plate being of substantially the same size, one of the plates adapted to extend from the rear wall forward, and the other from the front wall rearward to selectively cover substantially one-half of the recessed portion when only one plate is employed and all of the recessed portion when both of the plates are employed.

15. The storage tray of claim 12, wherein:

the leg of each dividing member has a lower end which terminates in a lower edge, and wherein a tab extends from the lower edge of each leg to define a shoulder, the shoulders of the dividing members adapted to insert into the corresponding opposite divider slots when in the second mode; and wherein the tray further comprises:

a pair of divider retaining members which extend upward from the bottom adjacent to each divider slot, the tab of each leg adapted to insert between the pair of retaining members when the shoulder is inserted into the divider slot in the second mode.

16. A method of storing generally flat, data storage media, the method comprising the steps of:

providing a storage tray having a flat bottom, opposite front and rear walls extending upward from the bottom, a pair of opposite sidewalls, each sidewall having a length and extending between the front and rear walls;

providing the storage tray with a pair of opposite ledges, each ledge protruding laterally inward from and extending along the entire length of one of the opposite sidewalls from the front wall to the rear wall, each ledge having a plurality of longitudinally spaced apart divider slots in each ledge which correspond and are aligned with the divider slots of the opposite ledge, each ledge being disposed above and parallel to the bottom to define a recessed portion between the ledges to selectively store media of a first size;

providing at least one removable, substantially flat plate having an upper surface and a lower surface and an upstanding partition member which protrudes upward from the upper surface of the plate and extends longitudinally along the center of the upper surface of the plate, and having a plurality of longitudinally spaced apart plate slots on either side of the partition;

providing a pair of substantially flat dividing members, each dividing member having a leg and a coupler for releasably coupling the dividing members together; and in a first mode positioning the plate across the recessed portion so that the plate is supported by the opposite ledges with the lower surface of the plate facing the bottom of the storage tray;

inserting the leg of each dividing member into one of the plate slots on each side of the partition so that one of the dividing members is held generally upright on each side of the partition; and then positioning storage media of a second size on the upper surface of the plate on at least one side of the partition so that the storage media of the second size are held generally upright by said one of the dividing members; and in a second mode coupling the dividing members together with the coupler to form a divider;

inserting the legs of the dividing members into corresponding opposite divider slots of the opposite ledges so that the divider is held generally upright and extends across the recessed portion; and then positioning the storage media of the first size within the recessed portion so that the storage media of the first size rest on the bottom and are held generally upright by the divider.

* * * * *